(12) United States Patent
Xu et al.

(10) Patent No.: US 8,750,917 B2
(45) Date of Patent: Jun. 10, 2014

(54) MULTIPLEXING AND POWER CONTROL OF UPLINK CONTROL CHANNELS IN A WIRELESS COMMUNICATION SYSTEM

(75) Inventors: Hao Xu, San Diego, CA (US); Durga Prasad Malladi, San Diego, CA (US); Rachel Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1443 days.

(21) Appl. No.: 12/117,457

(22) Filed: May 8, 2008

(65) Prior Publication Data

US 2008/0287155 A1   Nov. 20, 2008

Related U.S. Application Data

(60) Provisional application No. 60/938,995, filed on May 18, 2007.

(51) Int. Cl.
*H04W 52/00* (2009.01)
(52) U.S. Cl.
USPC .......................................................... 455/522
(58) Field of Classification Search
None
See application file for complete search history.

(56) References Cited

U.S. PATENT DOCUMENTS

| | | | |
|---|---|---|---|
| 5,579,321 A | 11/1996 | Van et al. | |
| 6,038,263 A | 3/2000 | Kotzin et al. | |
| 7,492,788 B2 | 2/2009 | Zhang et al. | |
| 2002/0012385 A1 | 1/2002 | Yun et al. | |
| 2002/0085619 A1 | 7/2002 | Cho et al. | |
| 2004/0013103 A1* | 1/2004 | Zhang et al. | 370/345 |
| 2004/0110473 A1 | 6/2004 | Rudolf et al. | |
| 2004/0180686 A1* | 9/2004 | Nakayama | 455/522 |
| 2005/0068931 A1 | 3/2005 | Cho et al. | |
| 2005/0163265 A1 | 7/2005 | Gupta et al. | |
| 2005/0283687 A1 | 12/2005 | Sutivong et al. | |
| 2006/0285601 A1 | 12/2006 | Julian et al. | |
| 2007/0183386 A1 | 8/2007 | Muharemovic et al. | |

(Continued)

FOREIGN PATENT DOCUMENTS

| | | |
|---|---|---|
| CN | 1394392 A | 1/2003 |
| CN | 1703034 A | 11/2005 |

(Continued)

OTHER PUBLICATIONS

ETRI: Cyclic-shift hopping for uplink sounding reference signalll 3GPP TSG RAN WG1 Meeting #478IS, vol. R1-070213, Jan. 15, 2007, XP002482750 Sorrento, Italy.

(Continued)

*Primary Examiner* — Philip Sobutka

(57) ABSTRACT

Techniques for transmitting control information in a wireless communication system are described. The system may support acknowledgement (ACK) channels and channel quality indicator (CQI) channels, which may have different target signal-to-noise ratios (SNRs). The ACK and CQI channels from different user equipments (UEs) may be multiplexed on the same resource block. In one design, the transmit power of a CQI channel may be set to achieve a nominal target SNR for CQI when not multiplexed with the ACK channels and may be reduced to achieve a lower target SNR when multiplexed with the ACK channels. In another design, the transmit power of an ACK channel may be set to achieve a nominal target SNR for ACK when not multiplexed with the CQI channels and may be boosted to achieve a higher target SNR when multiplexed with the CQI channels. The CQI channel may randomly hop to mitigate performance degradation.

36 Claims, 8 Drawing Sheets

(56) References Cited

U.S. PATENT DOCUMENTS

| | | | |
|---|---|---|---|
| 2008/0165891 A1 | 7/2008 | Budianu et al. | |
| 2008/0279170 A1 | 11/2008 | Malladi et al. | |
| 2008/0298502 A1 | 12/2008 | Xu et al. | |

FOREIGN PATENT DOCUMENTS

| | | |
|---|---|---|
| TW | 200518496 | 6/2005 |
| TW | 200627828 | 8/2006 |
| TW | 200709601 | 3/2007 |
| WO | WO2006007316 | 1/2006 |
| WO | WO2006130742 | 12/2006 |
| WO | WO2007087602 A2 | 8/2007 |
| WO | WO2008041080 | 4/2008 |
| WO | WO2008137963 | 11/2008 |

OTHER PUBLICATIONS

International Search Report and Written Opinion—PCT/US2008/063650, International Search Authority—European Patent Office—May 2, 2009.
"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006, XP002511692 Retrieved from the Internet: URL:http://www.3gpp.org/ftp/Specs/archive/25_series/25.814/25814-710.zip>; [retrieved on Jan. 22, 2009].
QUALCOMM Incorporated, "ACK/NAK Powers", C30-20020307-008 QCOM ACK NAK Power.doc, Mar. 7, 2002, http://ftp.3gpp2.org/TSGC/working/2002/TSG-C-0203/TSG-C_2002_03_Kobe/WG3/WG 3 Conference Call 2002.03.07/C30-20020307-008 QCOM ACK NAK Power.doc.
Taiwan Search Report—TW097118252—TIPO—Jan. 19, 2012.
Qualcomm Europe: Proposed Structure for UL ACK and CQI 3GPP DRAFT; R1-070437, 3rd Generation Partnership Project (3GPP), Mobile Competence Centre ; 650, Route Des Lucioles ; F-06921 Sophia-Antipolis Cedex ; France, vol tsg_ranWGI_RLITSGRI_47bisDocs, no Sorrento, Italy; 20070115, Jan. 9, 2007, XP050104468 paragraph [0001].
Taiwan Search Report—TW097118252—TIPO—Jan. 4, 2013.
Qualcomm Europe: "Joint Coding with CQI and ACK and Performance Evaluation" 3GPP Draft; R1-071811, 3rd Generation Partnership Project (3GPP), Mobile Competence Centre; 650, Route Des Luciole; F-06921 Sophia-Antipolis Cedex; France, vol. tsg_ran\WG1_RL1\TSGR1_48b\Docs, no. St. Julian; Mar. 26, 2007, Mar. 29, 2007, XP050105720 p. 1, lines 15,20-22, p. 2, lines 3-12,22,23, p. 3, lines 10-15, p. 4, lines 14,18-20, figures 3,4 p. 6, lines 2-9.
Technical Specification Group Radio Access Network: "3GPP TS 36.300-VI.0.0: Evolved Universal Terrestrial Radio Access (E-UTRA) and Evolved Universal Terrestrial Radio Access Network (E-UTRAN); Overall Description; Stage 2 (Release 8)" 3rd Generation Partnership Project (3GPP); Technicalspecification (TS), XX, XX, vol. 36.300, No. 1.0.0, Mar. 1, 2007, pp. 1-42, XP002447408 paragraphs [05.2], [5.3.1], [5.4.2].
Alcatel-Lucent, "Multiplexing Method for Uplink Non-Data-Associated Control Signals", 3GPP TSG-RAN WG1 #48bis, Mar. 30, 2007, pp. 1/6-6/6,R1-071719.
Qualcomm Europe: "PUCCH (CQI) Structure and Multiplexing" 3GPP Draft; R1-072036, 3rd Generation Partnership Project (3GPP), Mobile Competence Centre; 650, Route Des Lucioles; F-06921 Sophia-Antipolis Cedex; France, vol. tsg_ran\WG1_RL1\TSGR1_49\Docs, no. Kobe, Japan; May 7, 2007, Mar. 7, 2007, XP050105791, Section 2.
Qualcomm Europe, "RS structure for UL ACK transmission", 3GPP TSG RAN WG1#49, May 11, 2007, pp. 1-10,R1-072029.
Qualcomm Europe, "Cyclic Shift Hopping and Link Performance of UL ACK and CQI Channels", 3GPP TSG RAN #48, Feb. 16, 2007, pp. 1-8,R1-070661.
Qualcomm Europe,"RS structure for CQI transmission", 3GPP TSG RAN WG1 #49, May 11, 2007, pp. 1-5, R1-072030.
"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006, XP002511692 Retrieved from the Internet: URL:http://www.3gpp.org/ftp/Specs/archive/25_series/25.814/25814- 710.zip>; [retrieved on Jan. 22, 2009].
Qualcomm Europe: Proposed Structure for UL ACK and CQI 3GPP Draft; R1-070437, 3rd Generation Partnership Project (3GPP), Mobile Competence Centre; 650, Route Des Lucioles; F-06921 Sophia-Antipolis Cedex; France, vol. tsg_ranWGI_RLITSGRI_47bisDocs, no Sorrento, Italy; Jan. 15, 2007, Jan. 9, 2007, XP050104468 paragraph [0001]].
3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.
Qualcomm Europe: "Coding Structure for CQI+ACK", 3GPP TSG RAN WG1 #49, May 2, 2007, R1-072037, URL,http://www.3gpp.org/ftp/tsg_ran/WG1_RL1/TSGR1_49/Docs/R1-072037.zip.

* cited by examiner

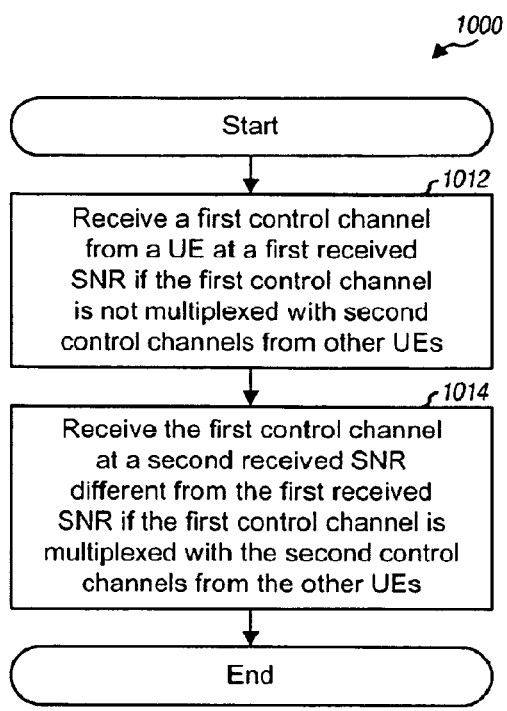
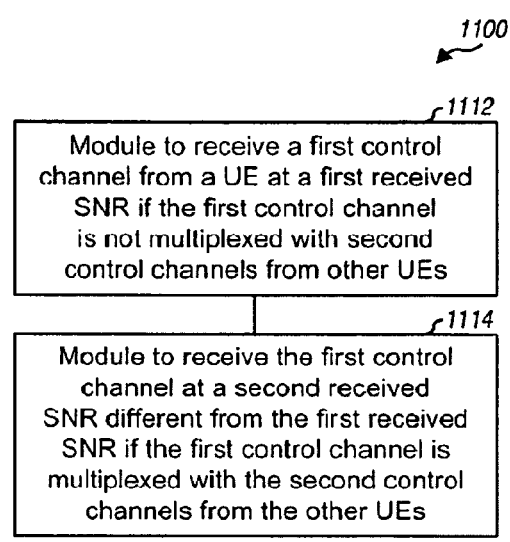
FIG. 10
FIG. 11

MULTIPLEXING AND POWER CONTROL OF UPLINK CONTROL CHANNELS IN A WIRELESS COMMUNICATION SYSTEM

The present application claims priority to provisional U.S. Application Ser. No. 60/938,995, entitled "A METHOD AND APPARATUS FOR UPLINK CONTROL CHANNEL MULTIPLEXING AND POWER CONTROL," filed May 18, 2007, assigned to the assignee hereof and incorporated herein by reference.

BACKGROUND

I. Field

The present disclosure relates generally to communication, and more specifically to techniques for transmitting control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data to a user equipment (UE) on the downlink and/or receive traffic data from the UE on the uplink. The downlink (or forward link) refers to the communication link from the Node B to the UE, and the uplink (or reverse link) refers to the communication link from the UE to the Node B. The UE may send channel quality indicator (CQI) information indicative of the downlink channel quality to the Node B. The Node B may select a rate or transport format based on the CQI information and may send traffic data at the selected rate or transport format to the UE. The UE may send acknowledgement (ACK) information for traffic data received from the Node B. The Node B may determine whether to retransmit pending traffic data or to transmit new traffic data to the UE based on the ACK information. It is desirable to reliably send ACK and CQI information in order to achieve good performance.

SUMMARY

Techniques for transmitting control information in a wireless communication system are described herein. The system may support different control channels such as ACK channels and CQI channels, which may have different performance requirements and different target signal-to-noise ratios (SNRs).

In an aspect, ACK and CQI channels from different UEs may be multiplexed on the same resource block. The ACK and CQI channels may be power controlled to achieve their target SNRs. In this case, interference from the CQI channels may degrade the performance of the ACK channels. In one design, the transmit power of a CQI channel may be (i) set to achieve a nominal target SNR for CQI when the CQI channel is not multiplexed with the ACK channels and (ii) reduced or backed off to achieve a lower target SNR when the CQI channel is multiplexed with the ACK channels. In another design, the transmit power of an ACK channel may be (i) set to achieve a nominal target SNR for ACK when the ACK channel is not multiplexed with the CQI channels and (ii) boosted to achieve a higher target SNR when the ACK channel is multiplexed with the CQI channels. In yet another design, a combination of backoff for the CQI channels and boost for the ACK channels may be used when these channels are multiplexed together.

Using a lower target SNR for the CQI channels and/or a higher target SNR for the ACK channels when these channels are multiplexed together may degrade CQI performance. In one design, a CQI channel from a UE may randomly hop so that the CQI channel is not always multiplexed with the ACK channels and hence suffers performance degradation. In another design, a Node B may perform erasure detection for the CQI channels when multiplexed with the ACK channels. The Node B may receive a CQI report from a CQI channel and may use the CQI report if it is sufficiently reliable and discard it otherwise. In yet another design, the Node B may perform detection with interference cancellation when the ACK and CQI channels are multiplexed together. The Node B may first detect the ACK channels (which may be more reliable), then estimate and cancel interference due to the detected ACK channels, and then detect the CQI channels (which may be less reliable).

Various aspects and features of the disclosure are described in further detail below.

BRIEF DESCRIPTION OF THE DRAWINGS

FIG. 10 shows a process for receiving control information.
FIG. 11 shows an apparatus for receiving control information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
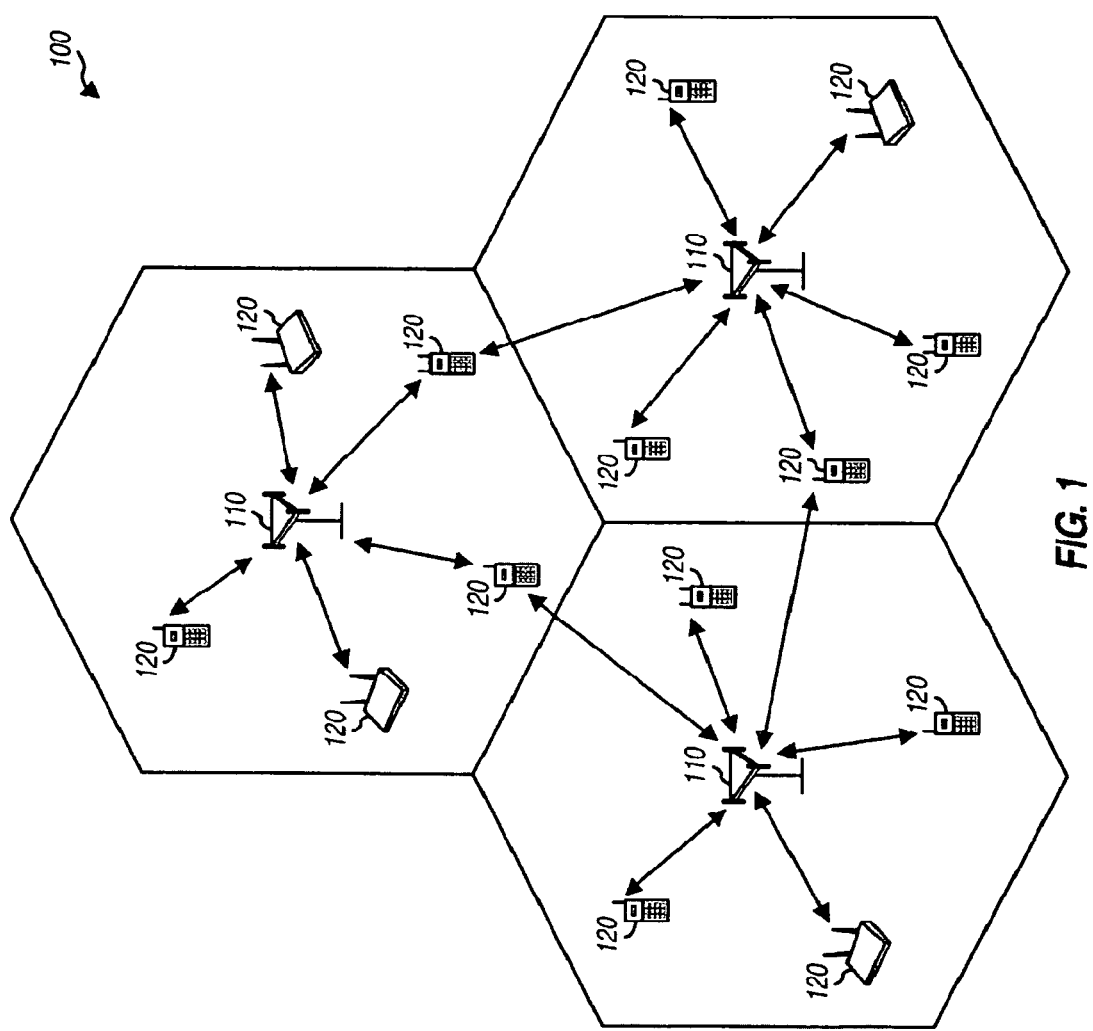
FIG. 1 shows a wireless communication system.

FIG. 1 shows a wireless communication system 100 with multiple Node Bs 110. A Node B may be a fixed station that communicates with the UEs and may also be referred to as al evolved Node B (eNB), a base station, all access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. The terms "UE" and "user" are used interchangeably herein.

Figure 2:
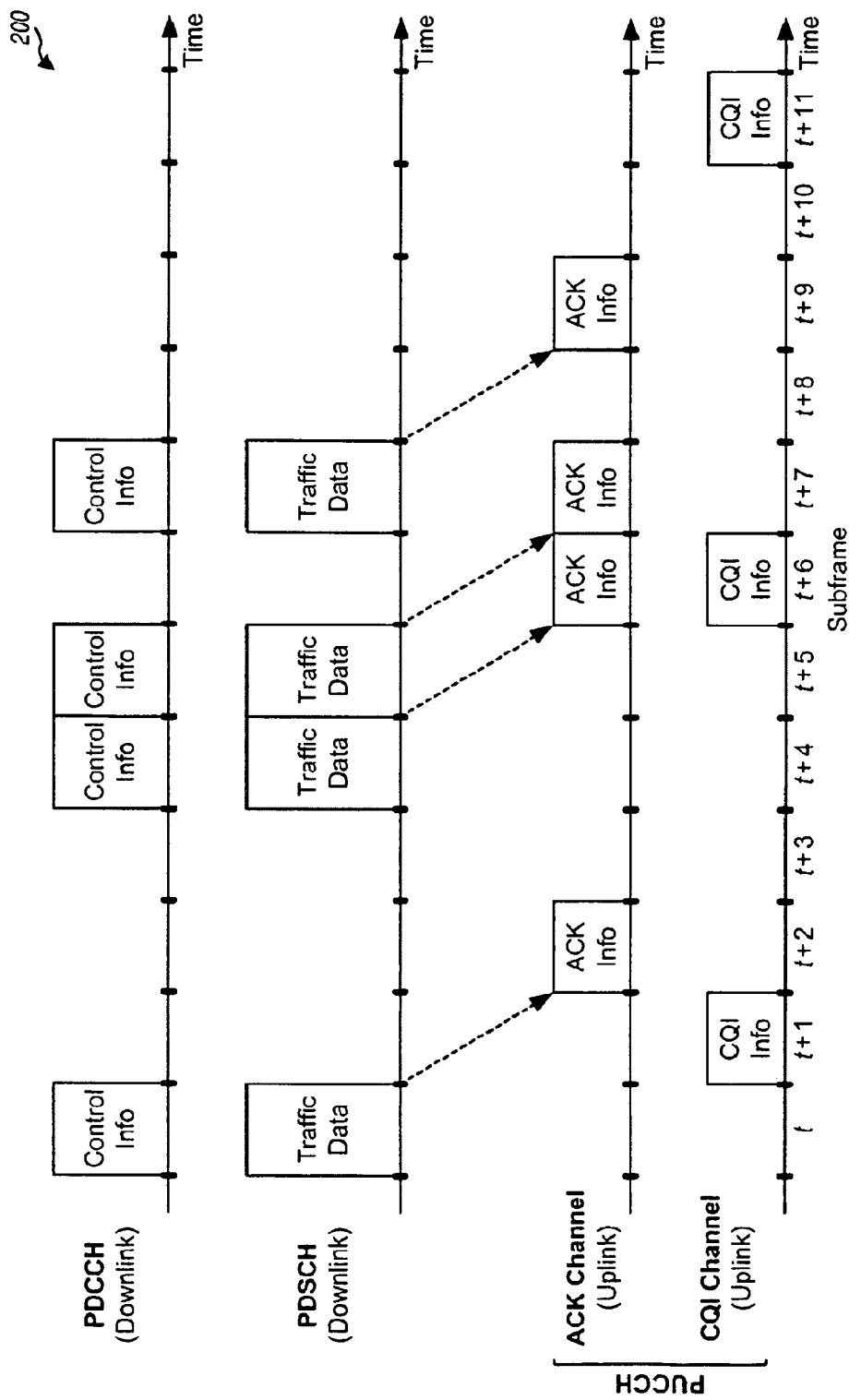
FIG. 2 shows example downlink and uplink transmissions.

FIG. 2 shows example downlink transmission by a Node B and example uplink transmission by a UE. The transmission timeline may be partitioned into units of subframes, with each subframe having a predetermined duration, e.g., one millisecond (ms). The UE may periodically estimate the downlink channel quality for the Node B and may send CQI information on a CQI channel to the Node B. The Node B may use the CQI information and/or other information to select the UE for downlink transmission and to select a suitable transport format (e.g., a modulation and coding scheme) for the UE. The Node B may process a transport block to obtain a corresponding codeword. The Node B may then send a transmission of the codeword on a physical downlink shared channel (PDSCH) and may send corresponding control information on a physical downlink control channel (PDCCH) to the UE. The UE may process the codeword transmission received from the Node B and may send ACK information on an ACK channel. The ACK and CQI channels may be part of a physical uplink control channel (PUCCH). The ACK information may comprise an ACK if the codeword is decoded correctly or a negative acknowledgement (NAK) if the codeword is decoded in error. The Node B may send another transmission of the codeword if a NAK is received and may send a transmission of a new codeword if an ACK is received. FIG. 2 shows an example in which the ACK information is delayed by two subframes. The ACK information may also be delayed by some other amount.

Figure 3:
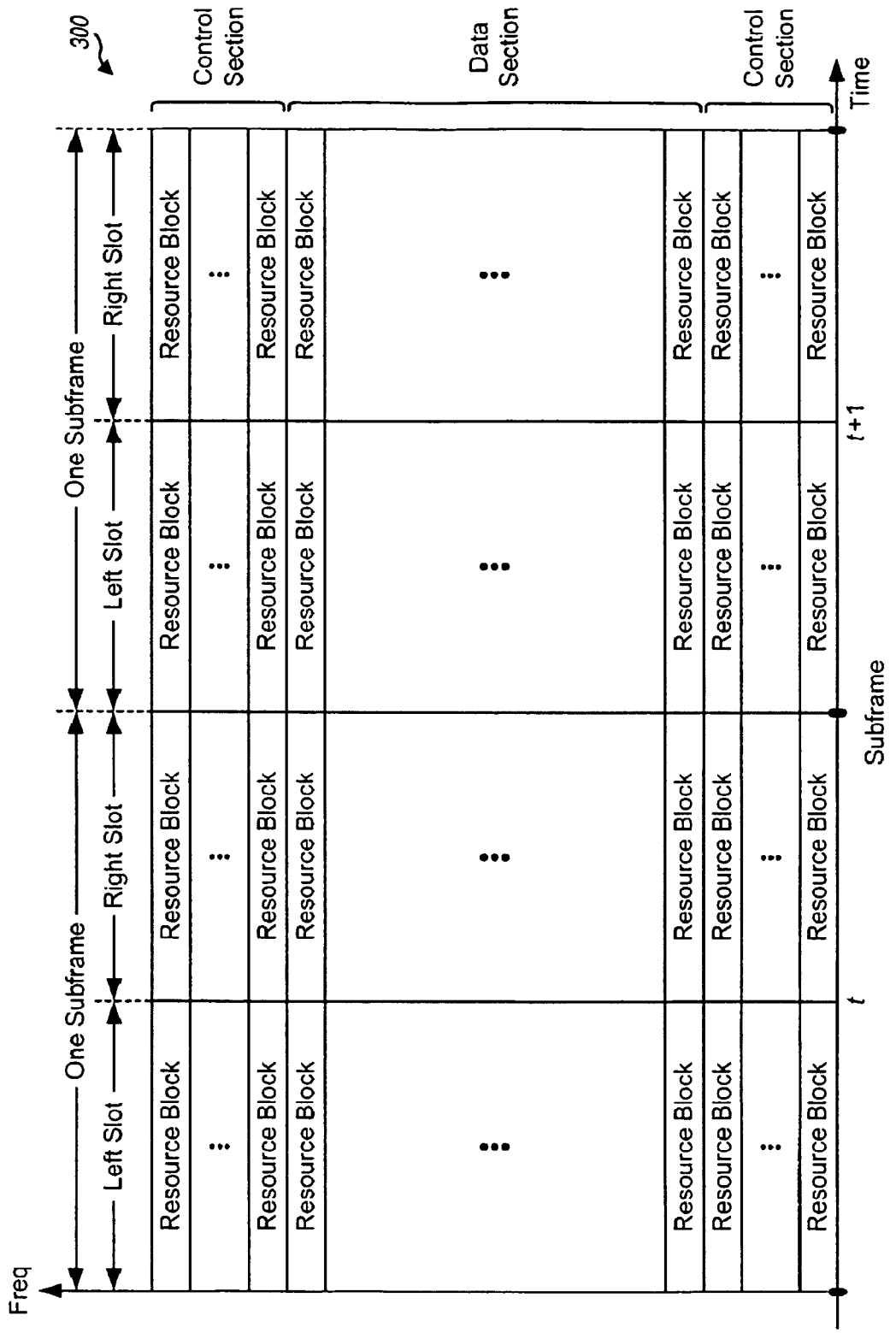
FIG. 3 shows an example transmission structure for the uplink.

FIG. 3 shows a design of a transmission structure 300 that may be used for the uplink. Each subframe may be partitioned into two slots. Each slot may include a fixed or configurable number of symbol periods, e.g., six symbol periods for an extended cyclic prefix or seven symbol periods for a normal cyclic prefix.

For the uplink, K total subcarriers may be available and may be grouped into resource blocks. Each resource block may include N subcarriers (e.g., N=12 subcarriers) in one slot. The available resource blocks may be divided into a data section and a control section. The control section may be formed at the two edges of the system bandwidth, as shown in FIG. 3. The control section may have a configurable size, which may be selected based on the amount of control information being sent on the uplink by the UEs. The resource blocks in the control section may be assigned to the UEs for transmission of ACK information, CQI information, etc. The data section may include all resource blocks not included in the control section. In general, any subset of the available resource blocks may be used to send control information, and remaining resource blocks may be used to send traffic data.

A UE may be assigned resource blocks in the control section to transmit ACK and/or CQI information to a Node B. The ACK information may convey whether each transport block sent by the Node B to the UE is decoded correctly or in error by the UE. The amount of ACK information to send by the UE may be dependent on the number of transport blocks sent to the UE. In one design, the ACK information may comprise one or two ACK bits depending on whether one or two transport blocks are sent to the UE. In other designs, the ACK information may comprise more ACK bits.

The CQI information may convey the downlink channel quality estimated by the UE for the Node B. The amount of CQI information to send by the UE may be dependent on various factors such as the number of spatial channels available for downlink transmission, the format for reporting the downlink channel quality, the desired granularity in the reported downlink channel quality, etc. In one design, the CQI information may comprise 8, 9 or 10 bits. In other designs, the CQI information may comprise fewer or more bits.

The UE may send ACK and/or CQI information on the PUCCH, which may be mapped to resource blocks in the control section. In one design, two PUCCH structures may be supported and are referred to as an ACK structure and a CQI structure. The ACK structure may be used to send only ACK information. The CQI structure may be used to send only CQI information or both ACK and CQI information. The ACK and CQI structures may also be referred to by other names. For example, the ACK structure may also be referred to as PUCCH format 0 or 1 depending on whether 1 or 2 ACK bits are being sent. The CQI structure may also be referred to as PUCCH format 2.

Figure 4:
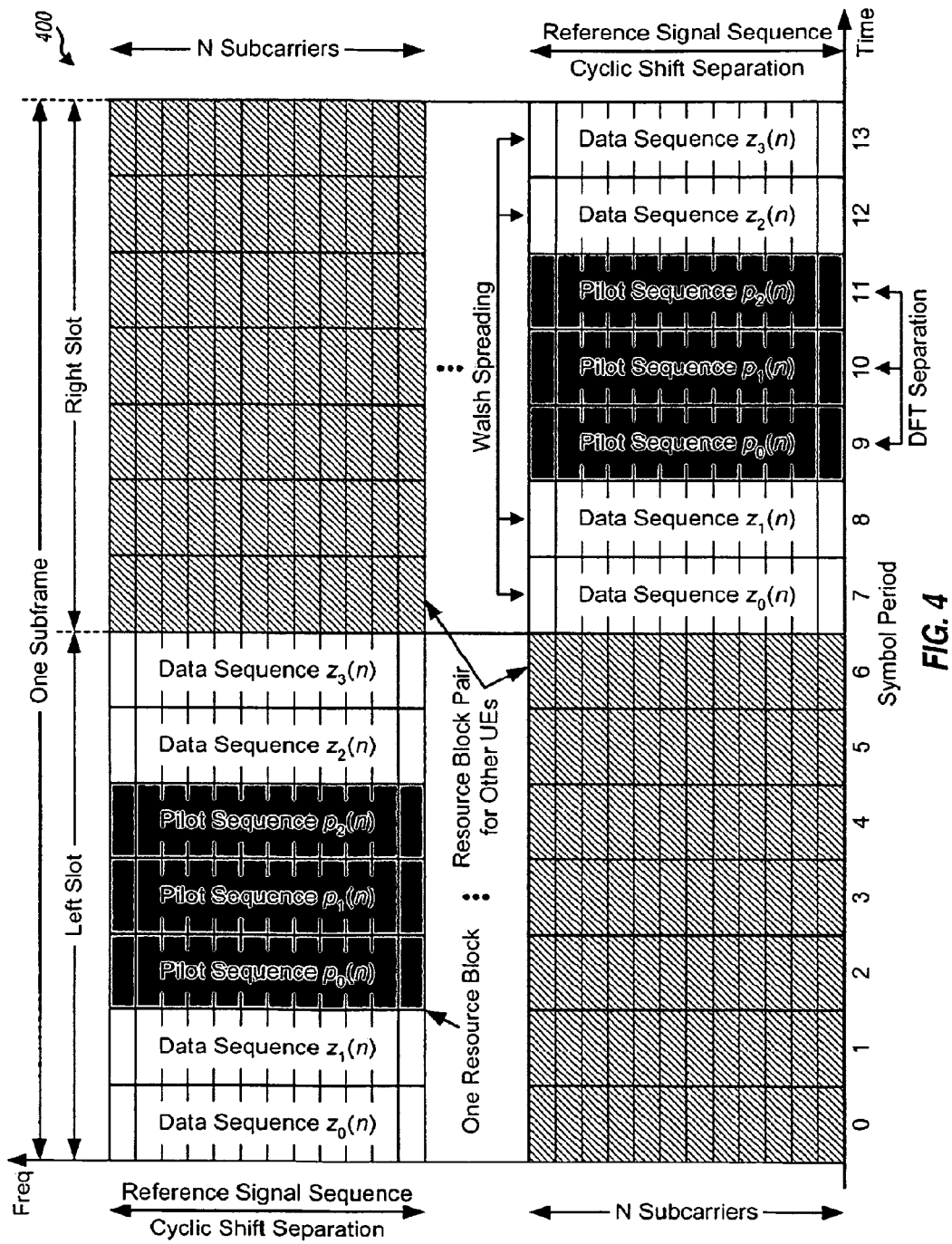
FIG. 4 shows an example ACK structure.

FIG. 4 shows a design of an ACK structure 400 for a case in which each slot includes seven symbol periods. In each subframe, the left slot includes seven symbol periods 0 through 6, and the right slot includes seven symbol periods 7 through 13. A set of UEs may concurrently send ACK information on a resource block pair that includes either (i) one resource block in the top control section in the left slot and one resource block in the bottom control section in the right slot, as shown in FIG. 4, or (ii) one resource block in the bottom control section in the left slot and one resource block in the top control section in the right slot (shown with diagonal hashing in FIG. 4). In the design shown in FIG. 4, each resource block for ACK includes four symbol periods for data and three symbol periods for pilot. Data and pilot for ACK may also be sent in other manners within a resource block.

Figure 5:
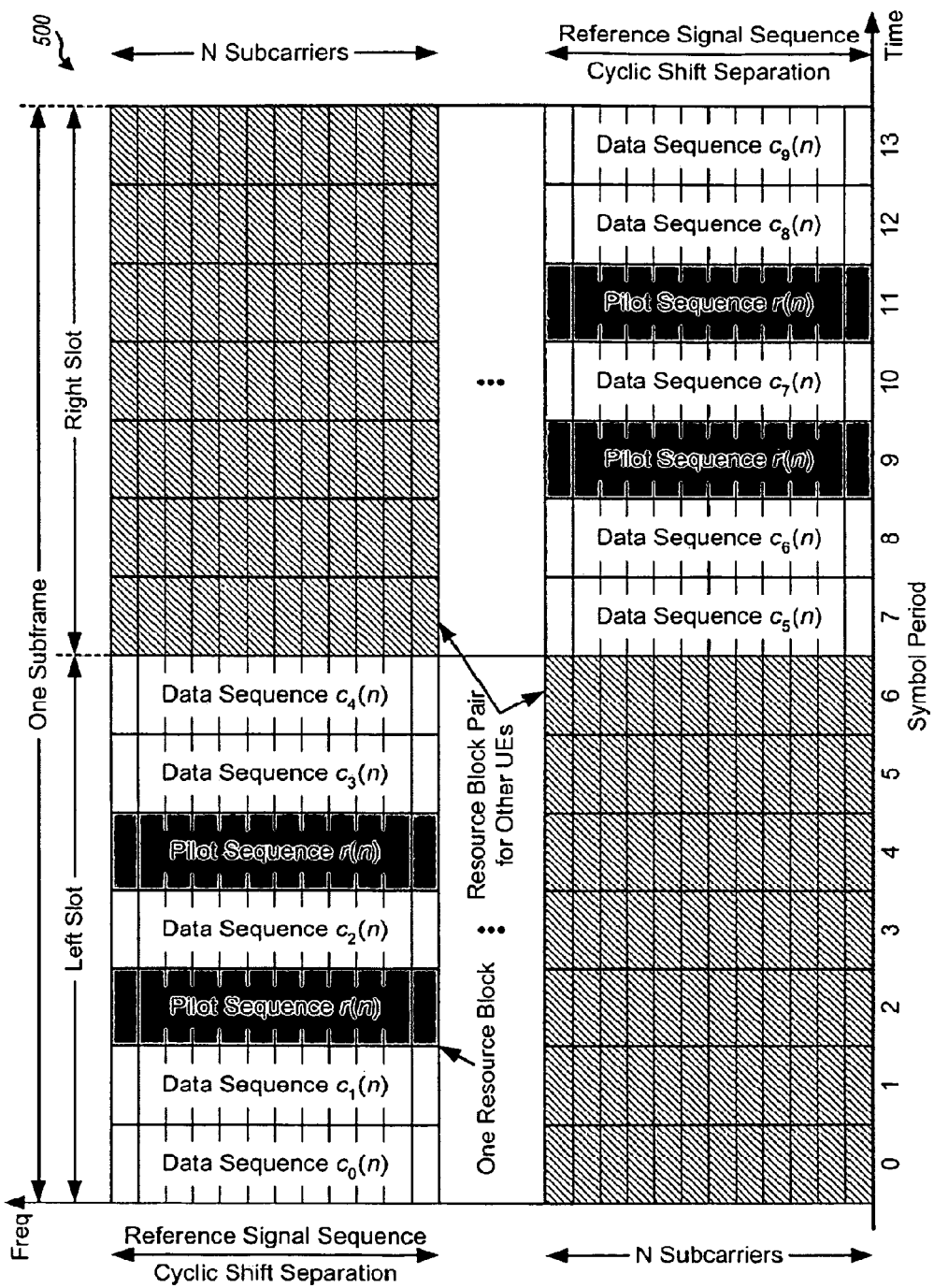
FIG. 5 shows an example CQI structure.

FIG. 5 shows a design of a CQI structure 500 for a case in which each slot includes seven symbol periods. In the design shown in FIG. 5, each resource block for CQI includes five symbol periods for data and two symbol periods for pilot. Data and pilot for CQI may also be sent in other manners within a resource block.

Table 1 lists some characteristics of the ACK and CQI structures in accordance with one design.

TABLE 1

PUCCH Structures

|  | ACK Structure | CQI Structure |
|---|---|---|
| Number of information bits | 1 or 2 | 8 to 10 |
| Encoding | None | Block code |
| Modulation scheme | BPSK or QPSK | QPSK |
| Number of modulation symbols | 1 | 10 |
| Number of symbol periods for data per slot | 4 | 5 |
| Number of channels supported | Up to 18 ACK channels | Up to 6 CQI channels |

ACK and CQI information may be sent in various manners. In one design, ACK and CQI information may be sent using reference signal sequences having good correlation properties. Different UEs may concurrently send ACK and/or CQI information on the same resource block using different reference signal sequences, which may be generated with a base sequence. The base sequence may be a CAZAC (constant amplitude zero auto correlation) sequence such as a Chu sequence, a Zardoff-Chu sequence, a Frank sequence, a generalized chirp-like (GCL) sequence, etc. The base sequence may also be a sequence defined to have good correlation properties.

In one design, six reference signal sequences of length N=12 may be generated with six different cyclic shifts of a base sequence of length 12. In general, any number of reference signal sequences may be generated. In one design, a UE may use a single reference signal sequence for all symbol periods of a subframe. In another design, the UE may use different reference signal sequences for different symbol periods or different slots of the subframe. This hopping may randomize interference.

A UE may send ACK information in various manners. In one design, the UE may first map one or two bits for ACK to a modulation symbol d(0) based on BPSK or QPSK, respectively. The UE may then modulate a reference signal sequence r(n) assigned to the UE with the modulation symbol d(0), as follows:

$$y(n)=d(0)\cdot r(n), \text{ for } n=0, \ldots, N-1, \qquad \text{Eq (1)}$$

where y(n) is a modulated sequence for ACK.

The UE may then spread the modulated sequence as follows:

$$z_m(n)=w(m)\cdot y(n), \text{ for } n=0, \ldots, N-1 \text{ and } m=0, \ldots, 3, \qquad \text{Eq (2)}$$

where w(m) is an orthogonal sequence assigned to the UE for ACK data, and $z_m(n)$ is a data sequence for ACK for symbol period m.

Four orthogonal sequences may be defined with a 4×4 Walsh matrix, and the UE may be assigned one of the four orthogonal sequences. In the design shown in equation (2), the UE may generate four data sequences $z_0(n)$ to $z_3(n)$ by multiplying the modulated sequence y(n) with four symbols w(0) to w(3), respectively, in the orthogonal sequence w(m) assigned to the UE. The UE may then send these four data sequences in four symbol periods 0, 1, 5 and 6 in the left slot and also in four symbol periods 7, 8, 12 and 13 in the right slot, as shown in FIG. 4.

The UE may send pilot for ACK in various manners. In one design, the UE may be assigned an orthogonal sequence q(m), which may be selected from a set of three orthogonal sequences $q_0(m)$, $q_1(m)$ and $q_2(m)$ defined based on a 3×3 discrete Fourier transform (DFT) matrix. The UE may spread its reference signal sequence r(n) with three symbols q(0) to q(2) in the orthogonal sequence q(m) assigned to the UE to obtain three pilot sequences $p_0(n)$ to $p_2(n)$, respectively. The UE may then send these three pilot sequences in three symbol periods 2, 3 and 4 in the left slot and also in three symbol periods 9, 10 and 11 in the right slot, as shown in FIG. 4.

Up to 18 UEs may concurrently send pilots for ACK with six reference signal sequences and three orthogonal sequences $q_0(m)$, $q_1(m)$ and $q_2(m)$. Up to 24 UEs may concurrently send data for ACK with six reference signal sequences and four orthogonal sequences $w_0(m)$ to $w_3(m)$. In one design, 18 ACK channels may be defined with six reference signal sequences, three orthogonal sequences for pilot, and four orthogonal sequences for data. The number of ACK channels may be limited by the number of UEs that can send pilots concurrently. Each ACK channel may be associated with a specific reference signal sequence r(n), a specific orthogonal sequence q(m) for pilot, and a specific orthogonal sequence WHOM) for data. Up to 18 UEs may concurrently send ACK information on up to 18 ACK channels on the same resource block pair. These UEs may be distinguished by (i) separation of the reference signal sequences in the frequency domain and (ii) spreading with the orthogonal sequences in the time domain.

A UE may send CQI information in various manners. In one design, the UE may first encode 8 to 10 information bits for CQI to obtain 20 code bits and may map these 20 code bits to ten modulation symbols d(0) through d(9). The UE may then modulate its reference signal sequencer r(n) with each modulation symbol d(m), as follows:

$$c_m(n)=d(m)\cdot r(n), \text{ for } n=0, \ldots, N-1 \text{ and } m=0, \ldots, 9, \qquad \text{Eq (3)}$$

where $c_m(n)$ is a data sequence for CQI for symbol period m. The UE may generate ten data sequences $c_0(n)$ to $c_9(n)$ for the ten modulation symbols d(0) to d(9), respectively. The UE may send these ten data sequences in ten symbol periods for CQI data in one resource block pair, e.g., as shown in FIG. 5.

The UE may send pilot for CQI in various manners. In one design, the UE may use its reference signal sequence r(n) directly as pilot sequences and may send its reference signal sequence in each symbol period for pilot, e.g., as shown in FIG. 5.

In one design, six CQI channels may be defined with six reference signal sequences. Each CQI channel may be associated with a specific reference signal sequence r(n). Up to six UEs may concurrently send data and pilot for CQI on up to six CQI channels on the same resource block pair. These UEs may be distinguished by separation of the reference signal sequences in the frequency domain.

In one design, for a case with six symbol periods per slot, data for ACK may be sent in four symbol periods, and pilot for ACK may be sent in two symbol periods. Data for CQI may be sent in five symbol periods, and pilot for CQI may be sent in one symbol period. Four reference signal sequences may be defined. Four CQI channels or eight ACK channels may be supported with one resource block pair.

In general, the number of ACK channels and the number of CQI channels that can be supported may be dependant on various factors such as the number of symbol periods per slot, the number of symbol periods for data, the number of symbol periods for pilot, the number of reference signal sequences, etc. For clarity, the following description assumes the designs shown in FIGS. 4 and 5 and Table 1.

Up to 12 ACK channels may be sent on the same resource block pair, e.g., as shown in FIG. 4. Up to six CQI channels may be sent on the same resource block pair, e.g., as shown in FIG. 5. The ACK and CQI channels may also be multiplexed on the same resource block pair. Each of the available reference signal sequences may be used for either ACK or CQI. Three ACK channels or one CQI channel may be supported with each reference signal sequence. The reference signal sequences are orthogonal to one another in the frequency domain. Thus, pilot for CQI may overlap data for ACK, and pilot for ACK may overlap data for CQI when multiplexing ACK and CQI channels on the same resource block. Table 2 lists seven configurations for multiplexing ACK and CQI channels and gives the number of ACK channels and the number of CQI channels for each configuration.

TABLE 2

| | Multiplexing ACK and CQI | | | |
|---|---|---|---|---|
| Configuration | # of Reference Signal Sequences for ACK | # of Reference Signal Sequences for CQI | # of ACK Channels | # of CQI Channels |
| 0 | 0 | 6 | 0 | 6 |
| 1 | 1 | 5 | 3 | 5 |
| 2 | 2 | 4 | 6 | 4 |
| 3 | 3 | 3 | 9 | 3 |

TABLE 2-continued

Multiplexing ACK and CQI

| Configuration | # of Reference Signal Sequences for ACK | # of Reference Signal Sequences for CQI | # of ACK Channels | # of CQI Channels |
|---|---|---|---|---|
| 4 | 4 | 2 | 12 | 2 |
| 5 | 5 | 1 | 15 | 1 |
| 6 | 6 | 0 | 18 | 0 |

In one design, ACK resources may be implicitly assigned to the UEs. The ACK resources assigned to a given UE may comprise resource blocks used for ACK, a reference signal sequence r(n), an orthogonal sequence w(m) for data, and an orthogonal sequence q(m) for pilot. A Node B may send control information on the PDCCH to the UE, as shown in FIG. 2. Different PDCCH resources (or indices) may be mapped to different ACK resources. The UE may ascertain the ACK resources assigned to the UE based on the PDCCH resources used to send the control information to the UE. In one design, CQI resources may be explicitly assigned to the UEs and may be signaled to the UEs. The ACK and CQI resources may also be assigned in other manners.

The ACK channels may have certain performance requirements and certain received signal quality requirements. Similarly, the CQI channels may have certain performance requirements and certain received signal quality requirements. The performance requirements may be given by a target block error rate (BLER), a target bit error rate (BER), a target packet error rate (PER), a target erasure rate, etc. The received signal quality requirements may be given by a target SNR, a target power spectral density (PSD), a target received signal level, etc. PSD and received signal level are indicative of the received power of an ACK or CQI channel at a Node B. SNR is a ratio of the received power to noise at the Node B. SNR and PSD may be equivalent when the noise is common or known. SNR may be given by an energy-per-symbol-to-noise ratio (Es/No), an energy-per-bit-to-total-noise ratio (Eb/Nt), etc.

When ACK channels from different UEs are multiplexed on the same resource block, the transmit power of each ACK channel may be adjusted with power control to achieve a target SNR for ACK. This target SNR may be selected to obtain a target BLER for ACK. Similarly, when CQI channels from different UEs are multiplexed on the same resource block, the transmit power of each CQI channel may be adjusted with power control to achieve a target SNR for CQI. This target SNR may be selected to obtain a target BLER for CQI. Orthogonality among the ACK or CQI channels being multiplexed on the same resource block may be maintained based on the following conditions:

Time delay spread of a wireless channel should be smaller than the time-domain cyclic shifts of the reference signal sequences, Power control should maintain similar long-term received SNRs for the ACK or CQI channels being multiplexed together, and Coherence time of the wireless channel should be longer than the Walsh spreading for the ACK channels. For example, orthogonal sequences of length 4 may be used for speed below 120 km/hr, and orthogonal sequences of length 2 may be used for high speed such as 350 km/hr.

Computer simulation shows that the performance of ACK channels is highly dependent on accurate power control. When ACK channels from different UEs have different long-term received SNRs, the performance of these ACK channels varies widely, and the performance of some ACK channels may not meet requirements. The simulation results show that power control should maintain similar long-term received SNRs for different ACK channels multiplexed on the same resource block in order to achieve good performance for these ACK channels. Similarly, power control should maintain similar long-term received SNRs for different CQI channels multiplexed on the same resource block in order to achieve good performance for these CQI channels.

The ACK and CQI channels from different UEs may be multiplexed together on the same resource block, e.g., as shown by configurations 1 through 5 in Table 2. Power control may attempt to maintain each ACK channel at its target SNR and to also maintain each CQI channel at its target SNR. However, even with power control operating as designed, the overall performance of the ACK and CQI channels may still suffer due to the following reasons. The ACK and CQI channels may have different target SNRs. Power control would then lead to a difference in PSDs for the ACK and CQI channels. This PSD difference may degrade orthogonality between the ACK and CQI channels, which may then result in mutual interference between these channels and lead to performance losses.

Various schemes may be used to address performance degradation due to multiplexing of ACK and CQI channels on the same resource block. In one scheme, ACK and CQI channels from different UEs are sent on different resource blocks and are not multiplexed together. The ACK resources may be implicitly mapped to PDCCH resources. A Node B may then send control information on the PDCCH to the UEs such that only ACK channels are multiplexed together. The Node B may assign CQI resources to the UEs such that the CQI channels are not multiplexed with the ACK channels. The transmit power of the ACK channels and the transmit power of the CQI channels may be power controlled separately to achieve the desired performance for ACK and CQI. This scheme may constrain the operation of a scheduler for the Node B.

In an aspect, ACK and CQI channels from different UEs may be multiplexed together on the same resource block. This may allow a Node B to freely send control information on the PDCCH to the UEs without having to ensure that only ACK channels are multiplexed together. The target BLER and the target SNR for the ACK channels may be different from those for the CQI channels. For example, the ACK channels may have a target BLER of 0.1% and a target SNR per antenna of about 2.8 dB. In contrast, the CQI channels may have a target BLER of 1% and a target SNR per antenna of about 7 dB. If the ACK and CQI channels are power controlled separately to achieve their target SNRs, then the performance of the ACK channels may degrade significantly for the reasons described above. This degradation in ACK performance may be mitigated in various manners.

In one design, the transmit power of a CQI channel may be (i) set to achieve a nominal target SNR of $SNR_{target\_nom}^{CQI}$ when the CQI channel is not multiplexed with the ACK channels and (ii) reduced or backed off to achieve a lower target SNR of $SNR_{target\_lower}^{CQI}$ when the CQI channel is multiplexed with the ACK channels. $SNR_{target\_lower}^{CQI}$ may be lower than $SNR_{target\_nom}^{CQI}$ by X decibels (dB), where X is a backoff factor and may be a predetermined amount. In this design, when the CQI channel is not multiplexed with the ACK channels on the same resource block, the transmit power of the CQI channel may be adjusted in the normal manner to achieve the target BLER for CQI. When the CQI channel is multiplexed with the ACK channels on the same resource block, the transmit power of the CQI channel may be reduced by the backoff factor of X dB from the nominal value in order to maintain good performance for the ACK channels.

In another design, the transmit power of an ACK channel may be (i) set to achieve a nominal target SNR of $SNR_{target\_nom}^{ACK}$ when the ACK channel is not multiplexed with the CQI channels and (ii) boosted to achieve a higher target SNR of $SNR_{target\_higher}^{ACK}$ when the ACK channel is multiplexed with the CQI channels. $SNR_{target\_higher}^{ACK}$ may be higher than $SNR_{target\_nom}^{ACK}$ by Y dB, where Y is a boost factor and may be a predetermined amount. In this design, when the ACK channel is not multiplexed with the CQI channels on the same resource block, the transmit power of the ACK channel may be adjusted in the normal manner to achieve the target BLER for ACK. When the ACK channel is multiplexed with the CQI channels on the same resource block, the transmit power of the ACK channel may be increased by the boost factor of Y dB from the nominal value in order to maintain good performance for the ACK channel.

In yet another design, a combination of backoff for the CQI channels and boost for the ACK channels may be used when these channels are multiplexed together. The transmit power of the CQI channels may be reduced by a backoff factor of X' dB from the nominal value for CQI. The transmit power of the ACK channels may be increased by a boost factor of Y' dB from the nominal value for ACK.

The backoff factor and/or the boost factor may be selected based on a tradeoff between ACK performance and CQI performance. In general, a larger backoff factor and/or a larger boost factor may improve ACK performance at the expense of CQI performance, and vice versa. In one design, the backoff factor and/or the boost factor may be fixed values that may be used whenever ACK and CQI channels are multiplexed on the same resource block. In another design, the backoff factor and/or the boost factor may be dependent on one or more parameters such as the number of CQI channels and the number of ACK channels being multiplexed, the nominal target SNR for the ACK channels, the nominal target SNR for the CQI channels, etc.

The transmit power of a designated transmission (e.g., a pilot channel or a CQI channel) from a UE may be adjusted with power control to maintain the received SNR for this transmission at a target SNR. The transmit power of another transmission (e.g., an ACK channel) from the UE may be set Δ dB higher or lower than the transmit power of the designated transmission. In one design, signaling (e.g., a 1-bit indication) may be sent to the UE to indicate whether or not its CQI channel is multiplexed with ACK channels from other UEs. In another design, signaling may be sent to the UE to indicate whether or not its ACK channel is multiplexed with CQIs channels from other UEs. In any case, the UE may apply the backoff factor for the CQI channel and/or the boost factor for the ACK channel when the signaling indicates multiplexing of the CQI channel (or the ACK channel) with the ACK channels (or the CQI channels) from the other UEs. The signaling may be sent periodically or only when the multiplexing status changes.

Using a lower target SNR for CQI channels and/or a higher target SNR for ACK channels when these channels are multiplexed together may degrade CQI performance. Various techniques may be used to mitigate the impact to CQI performance due to multiplexing of the ACK and CQI channels. In one design, a CQI channel from a UE may randomly hop so that the CQI channel is not always multiplexed with ACK channels and thus suffers higher BLED. The random hopping may be achieved by assigning the UE with different resource blocks for the CQI channel in different subframes, different reference signal sequences in different slots or symbol periods, etc. The different reference signal sequences may be derived from the same base sequence or different base sequences assigned to a Node B. The random hopping may result in the CQI channel being multiplexed (i) with ACK channels some of the time and with only CQI channels some other time and/or (ii) with ACK channels from different UEs in different subframes. A UE that is assigned a reference signal sequence of a given cyclic shift may be more prone to interference from UEs that are assigned reference signal sequences with adjacent cyclic shifts. The ACK and CQI channels may be assigned reference signal sequences with non-adjacent cyclic shifts to reduce interference.

In another design, a Node B may perform erasure detection for CQI channels when they are multiplexed with ACK channels in order to take into account the higher BLER for CQI due to multiplexing with the ACK channels. For erasure detection, the Node B may receive a CQI report on a CQI channel from a UE, use the report if the CQI channel is sufficiently reliable, and discard the report otherwise. In one design of erasure detection, the Node B may compute a metric for a codeword received on the CQI channel from the UE. This metric may be based on correlation between the received codeword and each possible codeword that can be sent on the CQI channel. The Node B may compute the difference between the two best correlation results and may compare this difference against a threshold. The Node B may use the received CQI report if the difference is greater than the threshold. The Node B may discard the received CQI report and use a prior CQI report or an average CQI if the difference is less than the threshold. The Node B may also perform erasure detection in other manners, e.g., with other metrics.

In yet another design, a Node B may perform detection with interference cancellation when ACK and CQI channels are multiplexed together. If the transmit power of the ACK channels is boosted and/or the transmit power of the CQI channels is reduced from their nominal values, then the reliability of the CQI channels may be worse than normal. In this case, the Node B may first detect the ACK channels, then estimate and cancel the interference due to the ACK channels, and then detect the CQI channels. If the transmit power of the ACK and CQI channels is maintained at their nominal values when these channels are multiplexed together, then the reliability of the ACK channels may be worse than normal. In this case, the Node B may first detect the CQI channels, then estimate and cancel the interference due to the CQI channels, and then detect the ACK channels. In general, the Node B may detect the more reliable control channels first, then estimate and cancel the interference due to the detected control channels, and then detect the less reliable control channels The techniques described herein may allow for multiplexing of ACK and CQI channels from different UEs on the same resource block in order to improve utilization of the available time-frequency resources. Power control for the ACK and/or CQI channels may be jointly optimized when these channels are multiplexed together to take into account the difference between the PSDs of the ACK and CQI channels and to reduce impact to ACK performance. Techniques such as random hopping, erasure detection, and interference cancellation may be used to mitigate the impact to CQI performance when the ACK and CQI channels are multiplexed together.

Different transmit power levels may be used for an ACK channel from a UE even when this ACK channel is multiplexed with only ACK channels from other UEs. In one design, different transmit power levels may be used for ACK and NAK to achieve different BLERs for ACK and NAK. An ACK-to-NAK error, which is due to a transmitted ACK being detected as a NAK, may result in an extra transmission of a transport block already decoded correctly by the UE. A NAK-to-ACK error, which is due to a transmitted NAK being detected as an ACK, may result in termination of a transport block decoded in error by the UE. A NAK-to-ACK error may thus be more catastrophic than an ACK-to-NAK error. The transmit power for NAK may be set higher than the transmit power for ACK in order to obtain a lower NAK-to-ACK error rate.

In another design, different transmit power levels may be used for an ACK channel depending on the number of ACK bits being sent. A single-input multiple-output (SIMO) UE may send one ACK bit with BPSK whereas a multiple-input multiple-output (MIMO) UE may send two ACK bits with QPSK. An ACK channel carrying two ACK bits may have a higher target SNR than an ACK channel carrying one ACK bit. Different transmit power levels may be used for the ACK channels from SIMO and MIMO UEs multiplexed together on the same resource block. The transmit power of the ACK channels from the MIMO UEs may be set higher to achieve the higher target SNR, and the transmit power of the ACK channels from the SIMO UEs may be set lower for the lower target SNR.

In yet another design, different transmit power levels may be used for a CQI channel depending on the number of information bits being sent. The CQI channel may have a higher target SNR when carrying ten information bits and may have a lower target SNR when carrying eight information bits. Different transmit power levels may be used for the CQI channel to meet the target SNRs for different numbers of information bits.

Figure 6:
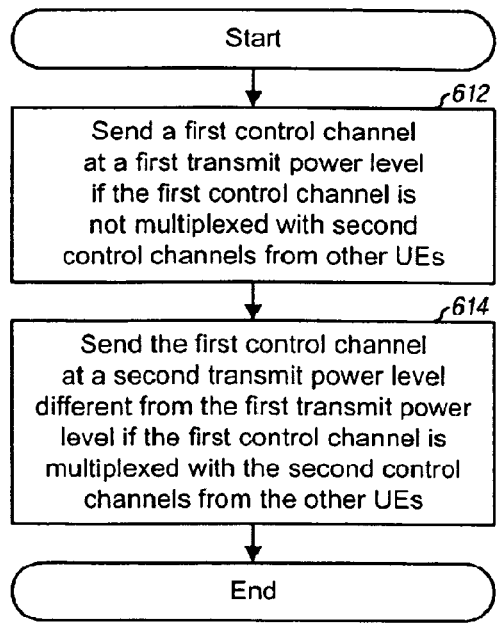
FIG. 6 shows a process for transmitting control information.

FIG. 6 shows a design of a process 600 for transmitting control information in a wireless communication system. Process 600 may be performed by a UE or some other entity. The UE may send a first control channel at a first transmit power level if the first control channel is not multiplexed with second control channels from other UEs (block 612). The UE may send the first control channel at a second transmit power level different from the first transmit power level if the first control channel is multiplexed with the second control channels from the other UEs (block 614). The first and second control channels may have different target SNRs and may thus have different received signal levels when multiplexed together. Spreading may be used for the first control channel and may not be used for the second control channels, or vice versa.

In one design, the first control channel may comprise a CQI channel, the second control channels may comprise ACK channels, and the second transmit power level may be lower than the first transmit power level. The first transmit power level may achieve a first target SNR for the CQI channel if not multiplexed with the ACK channels from the other UEs. The second transmit power level may achieve a second target SNR for the CQI channel if multiplexed with the ACK channels from the other UEs. The second target SNR may be lower than the first target SNR.

In another design, the first control channel may comprise an ACK channel, the second control channels may comprise CQI channels, and the second transmit power level may be higher than the first transmit power level. The first transmit power level may achieve a first target SNR for the ACK channel if not multiplexed with the CQI channels from the other UEs. The second transmit power level may achieve a second target SNR for the ACK channel if multiplexed with the CQI channels from the other UEs. The second target SNR may be higher than the first target SNR.

In yet another design, the first control channel may comprise an ACK channel carrying a first number of bits. The second control channels may comprise ACK channels carrying a second number of bits dial is different from the first number of bits. The first and second control channels may also comprise other types of control channel.

The UE may adjust its transmit power basted on power control. The UE may determine the first or second transmit power level based on first or second power offset, respectively, and the adjusted transmit power of the UE. The UE may receive signaling indicating whether or not the first control channel is multiplexed with the second control channels from the other UEs. The UE may then select the first or second transmit power level for the first control channel based on the signaling. The first control channel may hop to randomize multiplexing of the first control channel with the second control channels from the other UEs.

Figure 7:
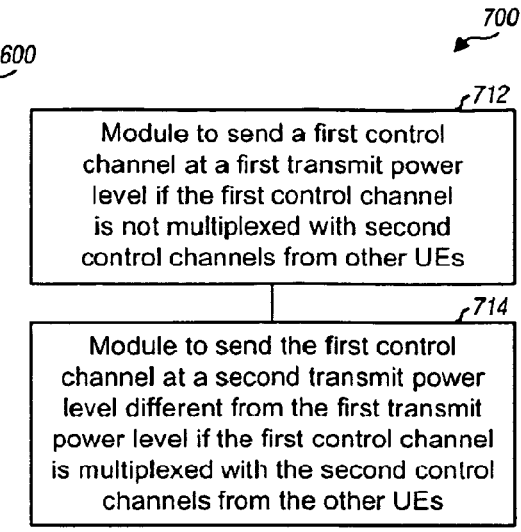
FIG. 7 shows an apparatus for transmitting control information.

FIG. 7 shows a design of an apparatus 700 for transmitting control information in a wireless communication system. Apparatus 700 includes a module 712 to send a first control channel at a first transmit power level if the first control channel is not multiplexed with second control channels from other UEs, and a module 714 to send the first control channel at a second transmit power level different from the first transmit power level if the first control channel is multiplexed with the second control channels from the other UEs.

Figure 8:
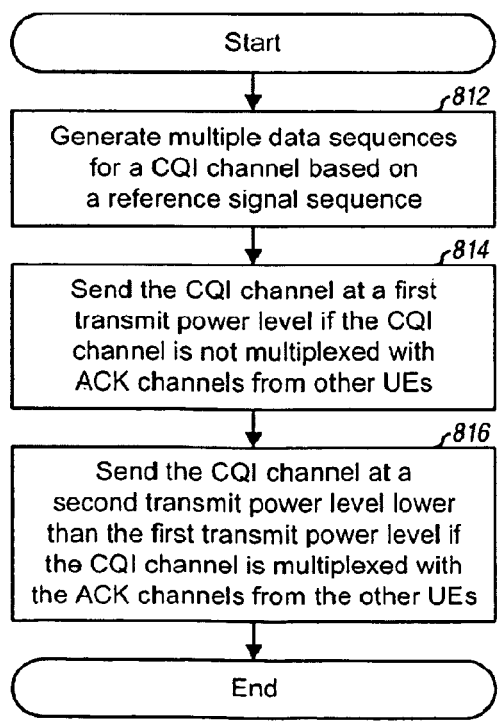
FIG. 8 shows a process for transmitting a CQI channel.

FIG. 8 shows a design of a process 800 for transmitting control information in a wireless communication system. Process 800 may be performed by a UE or some other entity. The UE may generate multiple data sequences for a CQI channel based on a reference signal sequence (block 812). The UE may send the CQI channel at a first transmit power level if the CQI channel is not multiplexed with ACK channels from other UEs (block 814). The UE may send the CQI channel at a second transmit power level lower than the first transmit power level if the CQI channel is multiplexed with the ACK channels from the other UEs (block 816). Data sequences for the ACK channels from the other UEs may be generated with at least one other reference signal sequence and spreading with orthogonal sequences. The reference signal sequence for the CQI channel and the at least one other reference signal sequence for the ACK channels may correspond to different cyclic shifts of a base sequence. The UE may send the multiple data sequences for the CQI channel in multiple symbol periods of a resource block. The data sequences for the ACK channels from the other UEs may be sent on the same resource block.

Figure 9:
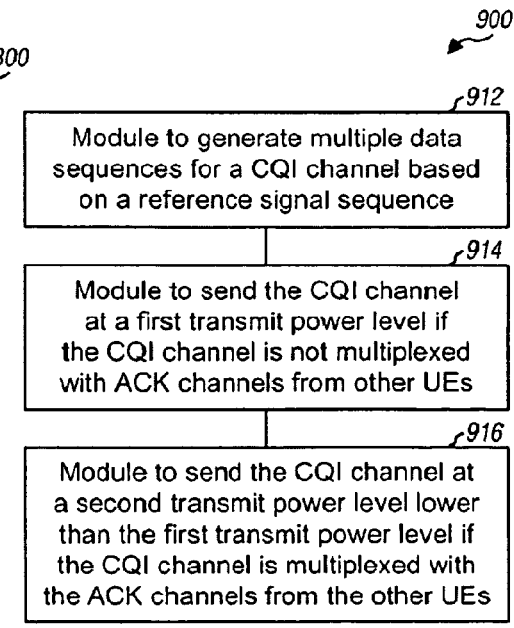
FIG. 9 shows an apparatus for transmitting a CQI channel.

FIG. 9 shows a design of an apparatus 900 for transmitting control information in a wireless communication system. Apparatus 900 includes a module 912 to generate multiple data sequences for a CQI channel based on a reference signal sequence, a module 914 to send the CQI channel at a first transmit power level if the CQI channel is not multiplexed with ACK channels from other UEs, and a module 916 to send the CQI channel at a second transmit power level lower than the first transmit power level if the CQI channel is multiplexed with the ACK channels from the other UEs.

FIG. 10 shows a design of a process 1000 for receiving control information in a wireless communication system. Process 1000 may be performed by a Node B or some other entity. The Node B may receive a first control channel from a UE at a first received SNR if the first control channel is not multiplexed with second control channels from other UEs (block 1012). The Node B may receive the first control channel at a second received SNR different from the first received SNR if the first control channel is multiplexed with the second control channels from the other UEs (block 1014). In one design, the Node B may perform detection for the first and second control channels with interference cancellation if these control channels are multiplexed together.

In one design, the first control channel may comprise a CQI channel, the second control channels may comprise ACK channels, and the second received SNR may be lower than the first received SNR. The Node B may perform erasure detection for the CQI channel if it is multiplexed with the ACK channels and may skip the erasure detection for the CQI channel if it is not multiplexed with the ACK channels. For the erasure detection, the Node B may determine whether the CQI channel is reliable based on a metric, use a CQI report received from the CQI channel if it is deemed reliable, and discard the CQI report otherwise. In another design, the first control channel may comprise an ACK channel, the second control channels may comprise CQI channels, and the second received SNR may be higher than the first received SNR.

FIG. 11 shows a design of an apparatus 1100 for receiving control information in a wireless communication system. Apparatus 1100 includes a module 1112 to receive a first control channel from a UE at a first received SNR if the first control channel is not multiplexed with second control channels from other UEs, and a module 1114 to receive the first control channel at a second received SNR different from the first received SNR if the first control channel is multiplexed with the second control channels from the other UEs.

The modules in FIGS. 7, 9 and 11 may comprise processors, electronics devices, hardware devices, electronics components, logical circuits, memories, etc., or any combination thereof.

Figure 12:
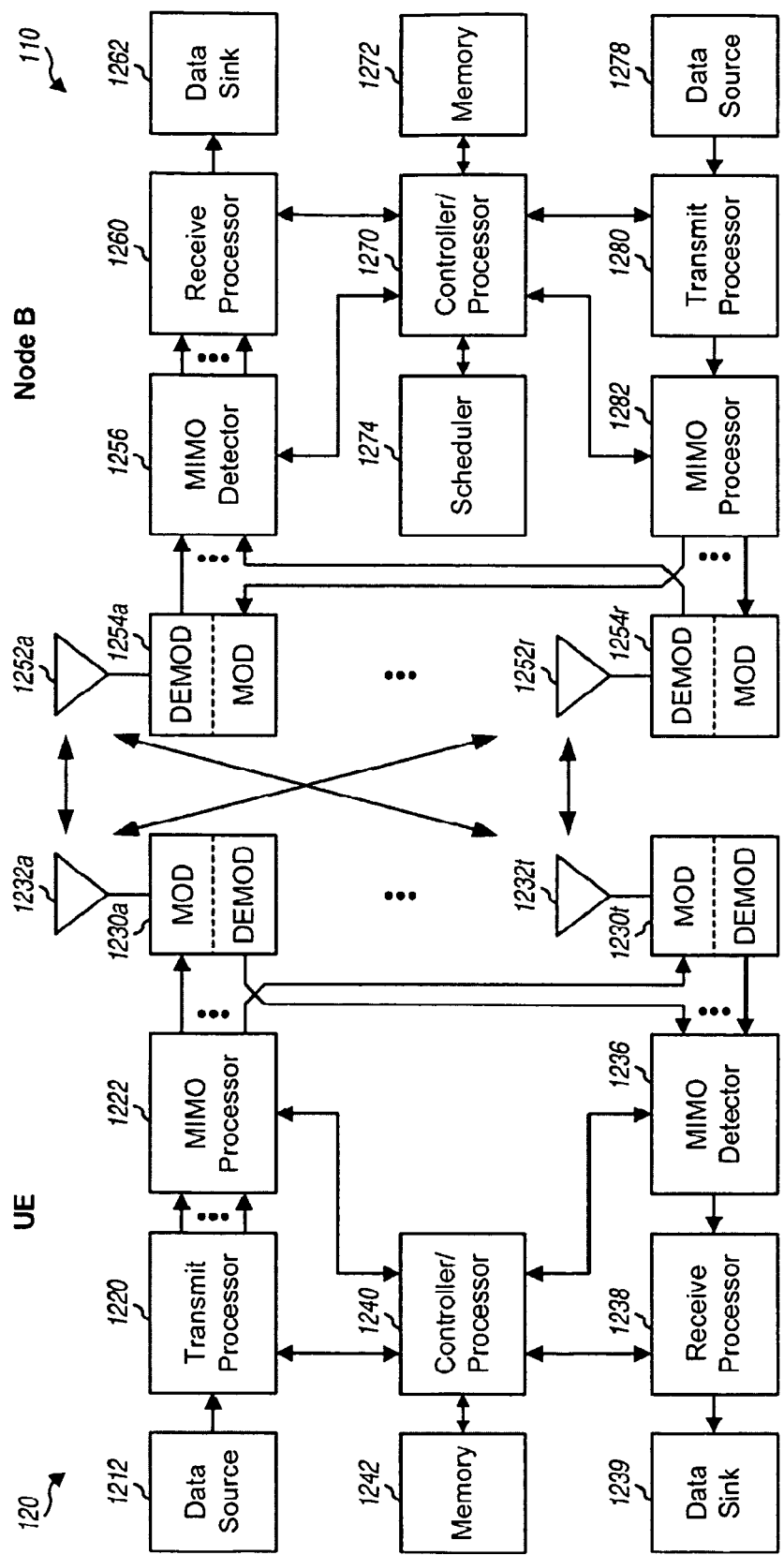
FIG. 12 shows a block diagram of a Node B and a UE.

FIG. 12 shows a block diagram of a design of a Node B 110 and a UE 120, which are one of the Node Bs and one of the UEs in FIG. 1. In this design, UE 120 is equipped with T antennas 1232a through 1232t, and Node B 110 is equipped with R antennas 1252a through 1252r, where in general T≥1 and R≥1.

At UE 120, a transmit processor 1220 may receive traffic data from a data source 1212, process (e.g., encode and symbol map) the traffic data, and provide data symbols. Transmit processor 1220 may also receive control information (e.g., ACK and/or CQI information) from a controller/processor 1240, process the control information as described above, and provide control symbols (e.g., for data sequences). Transmit processor 1220 may also generate pilot symbols (e.g., for pilot sequences) and multiplex the pilot symbols with the data symbols and control symbols. A MIMO processor 1222 may process (e.g., precode) the symbols from transmit processor 1220 and provide T output symbol streams to T modulators (MOD) 1230a through 1230t. MIMO processor 1222 may be omitted if UE 120 is equipped with a single antenna. Each modulator 1230 may process its output symbol stream (e.g., for SC-FDMA) to obtain an output sample stream. Each modulator 1230 may further condition (e.g., convert to analog, filter, amplify, and upconvert) its output sample stream to generate an uplink signal. T uplink signals from modulators 1230a through 1230t may be transmitted via T antennas 1232a through 1232t, respectively.

At Node B 110, antennas 1252a through 1252r may receive the uplink signals from UE 120 and/or other UEs. Each antenna 1252 may provide a received signal to a respective demodulator (DEMOD) 1254. Each demodulator 1254 may condition (e.g., filter, amplify, downconvert, and digitize) its received signal to obtain samples and may further process the samples (e.g., for SC-FDMA) to obtain received symbols. A MIMO detector 1256 may perform MIMO detection on the received symbols from all R demodulators 1254a through 1254r and provide detected symbols. A receive processor 1260 may process (e.g., demodulate and decode) the detected symbols, provide decoded traffic data to a data sink 1262, and provide decoded control information to a controller/processor 1270. In general, the processing by MIMO detector 1256 and receive processor 1260 is complementary to the processing by MIMO processor 1222 and transmit processor 1220, respectively, at UE 120.

Node B 110 may transmit traffic data and/or control information on the downlink to UE 120. Traffic data from a data source 1278 and/or control information from controller/processor 1270 may be processed by a transmit processor 1280 and further processed by a MIMO processor 1282 to obtain R output symbol streams. R modulators 1254a through 1254r may process the R output symbol streams (e.g., for OFDM) to obtain R output sample streams and may further condition the output sample streams to obtain R downlink signals, which may be transmitted via R antennas 1252a through 1252r. At UE 120, the downlink signals from Node B 110 may be received by antennas 1232a through 1232t, conditioned and processed by demodulators 1230a through 1230t, and further processed by a MIMO detector 1236 (if applicable) and a receive processor 1238 to recover the traffic data and control information sent to UE 120. Receive processor 1238 may provide the traffic data to a data sink 1239 and provide the control information to controller/processor 1240.

Controllers/processors 1240 and 1270 may direct the operation at UE 120 and Node B 110, respectively. Controller/processor 1240 may perform or direct process 600 in FIG. 6, process 800 in FIG. 8, and/or other processes for the techniques described herein. Controller/processor 1270 may perform or direct process 1000 in FIG. 10 and/or other processes for the techniques described herein. Memories 1242 and 1272 may store data and program codes for UE 120 and Node B 110, respectively. A scheduler 1274 may schedule UEs for data transmission on the downlink and/or uplink and may assign resources to the scheduled UEs. Scheduler 1274 may also explicitly and/or implicitly assign ACK and CQI resources to the UEs for transmission of ACK and CQI information. The ACK and CQI resources may comprise resource blocks, reference signal sequences, orthogonal sequences for pilot, orthogonal sequences for data, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   sending a first control channel at a first transmit power level if the first control channel is not multiplexed with second control channels from other user equipments (UEs);
   sending the first control channel at a second transmit power level different from the first transmit power level if the first control channel is multiplexed with the second control channels from the other UEs;
   adjusting transmit power of a user equipment (UE) based on power control; and
   determining the first or second transmit power level based on first or second power offset, respectively, and the adjusted transmit power of the UE.

2. The method of claim 1, wherein the first control channel comprises a channel quality indicator (CQI) channel, wherein the second control channels comprise acknowledgement (ACK) channels, and wherein the second transmit power level is lower than the first transmit power level.

3. The method of claim 1, wherein the first control channel comprises an acknowledgement (ACK) channel, wherein the second control channels comprise channel quality indicator (CQI) channels, and wherein the second transmit power level is higher than the first transmit power level.

4. The method of claim 1, wherein the first control channel comprises an acknowledgement (ACK) channel carrying a first number of bits, and wherein the second control channels comprise ACK channels carrying a second number of bits different from the first number of bits.

5. The method of claim 1, further comprising:
   hopping the first control channel to randomize multiplexing of the first control channel with the second control channels from the other UEs.

6. A method for wireless communication, comprising:
   sending a first control channel at a first transmit power level if the first control channel is not multiplexed with second control channels from other user equipments (UEs); and
   sending the first control channel at a second transmit power level different from the first transmit power level if the first control channel is multiplexed with the second control channels from the other UEs,
   wherein the first control channel comprises a channel quality indicator (CQI) channel, wherein the second control channels comprise acknowledgement (ACK) channels, wherein the second transmit power level is lower than the first transmit power level,
   wherein the first transmit power level achieves a first target signal-to-noise ratio (SNR) for the CQI channel if not multiplexed with the ACK channels from the other UEs, and wherein the second transmit power level achieves a second target SNR for the CQI channel if multiplexed with the ACK channels from the other UEs, the second target SNR being lower than the first target SNR.

7. A method for wireless communication, comprising:
   sending a first control channel at a first transmit power level if the first control channel is not multiplexed with second control channels from other user equipments (UEs); and
   sending the first control channel at a second transmit power level different from the first transmit power level if the first control channel is multiplexed with the second control channels from the other UEs,
   wherein the first control channel comprises an acknowledgement (ACK) channel, wherein the second control channels comprise channel quality indicator (CQI)

channels, wherein the second transmit power level is higher than the first transmit power level,
wherein the first transmit power level achieves a first target signal-to-noise ratio (SNR) for the ACK channel if not multiplexed with the CQI channels from the other UEs, and wherein the second transmit power level achieves a second target SNR for the ACK channel if multiplexed with the CQI channels from the other UEs, the second target SNR being higher than the first target SNR.

8. A method for wireless communication, comprising:
sending a first control channel at a first transmit power level if the first control channel is not multiplexed with second control channels from other user equipments (UEs); and
sending the first control channel at a second transmit power level different from the first transmit power level if the first control channel is multiplexed with the second control channels from the other UEs,
wherein the first control channel comprises an acknowledgement (ACK) channel, wherein the second control channels comprise channel quality indicator (CQI) channels, wherein the second transmit power level is higher than the first transmit power level,
wherein the sending the first control channel at the first transmit power level comprises sending an ACK at the first transmit power level or a negative acknowledgement (NAK) at a third transmit power level if the ACK channel is not multiplexed with the CQI channels from the other UEs, the third transmit power level being higher than the first transmit power level, and wherein the sending the first control channel at the second transmit power level comprises sending the ACK at the second transmit power level or the NAK at a fourth transmit power level if the ACK channel is multiplexed with the CQI channels from the other UEs, the fourth transmit power level being higher than the second transmit power level.

9. A method for wireless communication, comprising:
sending a first control channel at a first transmit power level if the first control channel is not multiplexed with second control channels from other user equipments (UEs); and
sending the first control channel at a second transmit power level different from the first transmit power level if the first control channel is multiplexed with the second control channels from the other UEs,
wherein spreading is used for one of the first and second control channels and is not used for other one of the first and second control channels.

10. A method for wireless communication, comprising:
sending a first control channel at a first transmit power level if the first control channel is not multiplexed with second control channels from other user equipments (UEs); and
sending the first control channel at a second transmit power level different from the first transmit power level if the first control channel is multiplexed with the second control channels from the other UEs,
wherein the first and second control channels have different target signal-to-noise ratios (SNRs) and different received signal levels when multiplexed together.

11. A method for wireless communication, comprising:
sending a first control channel at a first transmit power level if the first control channel is not multiplexed with second control channels from other user equipments (UEs);
sending the first control channel at a second transmit power level different from the first transmit power level if the first control channel is multiplexed with the second control channels from the other UEs;
receiving signaling indicating whether or not the first control channel is multiplexed with the second control channels from the other UEs; and
selecting the first or second transmit power level for the first control channel based on the signaling.

12. An apparatus for wireless communication, comprising:
at least one processor configured to send a first control channel at a first transmit power level if the first control channel is not multiplexed with second control channels from other user equipments (UEs), and to send the first control channel at a second transmit power level different from the first transmit power level if the first control channel is multiplexed with the second control channels from the other UEs,
wherein the at least one processor is configured to adjust transmit power of a user equipment (UE) based on power control, and to determine the first or second transmit power level based on first or second power offset, respectively, and the adjusted transmit power of the UE.

13. The apparatus of claim 12, wherein the first control channel comprises a channel quality indicator (CQI) channel, wherein the second control channels comprise acknowledgement (ACK) channels, and wherein the second transmit power level is lower than the first transmit power level.

14. The apparatus of claim 12, wherein the first control channel comprises an acknowledgement (ACK) channel, wherein the second control channels comprise channel quality indicator (CQI) channels, and wherein the second transmit power level is higher than the first transmit power level.

15. The apparatus of claim 12, wherein the at least one processor is configured to hop the first control channel to randomize multiplexing of the first control channel with the second control channels from the other UEs.

16. An apparatus for wireless communication, comprising:
means for sending a first control channel at a first transmit power level if the first control channel is not multiplexed with second control channels from other user equipments (UEs);
means for sending the first control channel at a second transmit power level different from the first transmit power level if the first control channel is multiplexed with the second control channels from the other UEs;
means for adjusting transmit power of a user equipment (UE) based on power control; and
means for determining the first or second transmit power level based on first or second power offset, respectively, and the adjusted transmit power of the UE.

17. The apparatus of claim 16, wherein the first control channel comprises a channel quality indicator (CQI) channel, wherein the second control channels comprise acknowledgement (ACK) channels, and wherein the second transmit power level is lower than the first transmit power level.

18. The apparatus of claim 16, wherein the first control channel comprises an acknowledgement (ACK) channel, wherein the second control channels comprise channel quality indicator (CQI) channels, and wherein the second transmit power level is higher than the first transmit power level.

19. The apparatus of claim 16, further comprising:
means for hopping the first control channel to randomize multiplexing of the first control channel with the second control channels from the other UEs.

20. A computer program product, comprising:
a non-transitory computer-readable medium comprising:
code for causing at least one computer to send a first control channel at a first transmit power level if the first control channel is not multiplexed with second control channels from other user equipments (UEs);

code for causing the at least one computer to send the first control channel at a second transmit power level different from the first transmit power level if the first control channel is multiplexed with the second control channels from the other UEs;

code for causing at least one computer to adjust transmit power of a user equipment (UE) based on power control; and code for causing at least one computer to determine the first or second transmit power level based on first or second power offset, respectively, and the adjusted transmit power of the UE.

21. A method for wireless communication, comprising:
sending a channel quality indicator (CQI) channel at a first transmit power level if the CQI channel is not multiplexed with acknowledgement (ACK) channels from other user equipments (UEs);
sending the CQI channel at a second transmit power level lower than the first transmit power level if the CQI channel is multiplexed with the ACK channels from the other UEs; and
generating multiple data sequences for the CQI channel without spreading, wherein the sending the CQI channel at the second transmit power level comprises sending the multiple data sequences in multiple symbol periods of a resource block at the second transmit power level, and wherein the ACK channels from the other UEs are sent with spreading in the resource block.

22. A method for wireless communication, comprising:
sending a channel quality indicator (CQI) channel at a first transmit power level if the CQI channel is not multiplexed with acknowledgement (ACK) channels from other user equipments (UEs);
sending the CQI channel at a second transmit power level lower than the first transmit power level if the CQI channel is multiplexed with the ACK channels from the other UEs; and
generating multiple data sequences for the CQI channel based on a reference signal sequence, wherein the sending the CQI channel at the second transmit power level comprises sending the multiple data sequences in multiple symbol periods of a resource block at the second transmit power level, wherein data sequences for the ACK channels from the other UEs are generated with at least one other reference signal sequence, and wherein the reference signal sequence and the at least one other reference signal sequence correspond to different cyclic shifts of a base sequence.

23. An apparatus for wireless communication, comprising:
at least one processor configured to send a channel quality indicator (CQI) channel at a first transmit power level if the CQI channel is not multiplexed with acknowledgement (ACK) channels from other user equipments (UEs), and to send the CQI channel at a second transmit power level lower than the first transmit power level if the CQI channel is multiplexed with the ACK channels from the other UEs,
wherein the at least one processor is configured to generate multiple data sequences for the CQI channel without spreading, and to send the multiple data sequences in multiple symbol periods of a resource block at the second transmit power level, wherein the ACK channels from the other UEs are sent with spreading in the resource block.

24. An apparatus for wireless communication, comprising:
at least one processor configured to send a channel quality indicator (CQI) channel at a first transmit power level if the CQI channel is not multiplexed with acknowledgement (ACK) channels from other user equipments (UEs), and to send the CQI channel at a second transmit power level lower than the first transmit power level if the CQI channel is multiplexed with the ACK channels from the other UEs,
wherein the at least one processor is configured to generate multiple data sequences for the CQI channel based on a reference signal sequence, and to send the multiple data sequences in multiple symbol periods of a resource block at the second transmit power level, wherein data sequences for the ACK channels from the other UEs are generated with at least one other reference signal sequence, and wherein the reference signal sequence and the at least one other reference signal sequence correspond to different cyclic shifts of a base sequence.

25. A method for wireless communication, comprising:
receiving a first control channel from a user equipment (UE) at a first received signal-to-noise ratio (SNR) if the first control channel is not multiplexed with second control channels from other UEs; and
receiving the first control channel at a second received SNR different from the first received SNR if the first control channel is multiplexed with the second control channels from the other UEs,
wherein the first control channel comprises a channel quality indicator (CQI) channel, wherein the second control channels comprise acknowledgement (ACK) channels, and wherein the second received SNR is lower than the first received SNR, the method further comprising:
performing erasure detection for the CQI channel if multiplexed with the ACK channels from the other UEs; and
skipping the erasure detection for the CQI channel if not multiplexed with the ACK channels from the other UEs.

26. The method of claim 25, wherein the first control channel comprises an acknowledgement (ACK) channel, wherein the second control channels comprise channel quality indicator (CQI) channels, and wherein the second received SNR is higher than the first received SNR.

27. The method of claim 25, further comprising:
performing detection for the first and second control channels with interference cancellation if the first and second control channels are multiplexed together.

28. A method for wireless communication, comprising:
receiving a first control channel from a user equipment (UE) at a first received signal-to-noise ratio (SNR) if the first control channel is not multiplexed with second control channels from other UEs; and
receiving the first control channel at a second received SNR different from the first received SNR if the first control channel is multiplexed with the second control channels from the other UEs,
wherein the first control channel comprises a channel quality indicator (CQI) channel, wherein the second control channels comprise acknowledgement (ACK) channels, and wherein the second received SNR is lower than the first received SNR, the method further comprising:
determining whether the CQI channel is reliable based on a metric;
using a CQI report received from the CQI channel if the CQI channel is deemed reliable; and
discarding the CQI report if the CQI channel is deemed unreliable.

29. An apparatus for wireless communication, comprising:
at least one processor configured to receive a first control channel from a user equipment (UE) at a first received signal-to-noise ratio (SNR) if the first control channel is not multiplexed with second control channels from other UEs, and to receive the first control channel at a second received SNR different from the first received SNR if the first control channel is multiplexed with the second control channels from the other UEs, wherein the first control channel comprises a channel quality indicator (CQI) channel, wherein the second control channels comprise acknowledgement (ACK) channels, wherein the second received SNR is lower than the first received SNR, and wherein the at least one processor is configured to perform erasure detection for the CQI channel if multiplexed with the ACK channels from the other UEs, and to skip the erasure detection for the CQI channel if not multiplexed with the ACK channels from the other UEs.

30. The apparatus of claim 29, wherein the first control channel comprises an acknowledgement (ACK) channel, wherein the second control channels comprise channel quality indicator (CQI) channels, and wherein the second received SNR is higher than the first received SNR.

31. The apparatus of claim 29, wherein the at least one processor is configured to perform detection for the first and second control channels with interference cancellation if the first and second control channels are multiplexed together.

32. An apparatus for wireless communication, comprising:
at least one processor configured to receive a first control channel from a user equipment (UE) at a first received signal-to-noise ratio (SNR) if the first control channel is not multiplexed with second control channels from other UEs, and to receive the first control channel at a second received SNR different from the first received SNR if the first control channel is multiplexed with the second control channels from the other UEs, wherein the first control channel comprises a channel quality indicator (CQI) channel, wherein the second control channels comprise acknowledgement (ACK) channels, wherein the second received SNR is lower than the first received SNR, and wherein the at least one processor is configured to determine whether the CQI channel is reliable based on a metric, to use a CQI report received from the CQI channel if the CQI channel is deemed reliable, and to discard the CQI report if the CQI channel is deemed unreliable.

33. An apparatus for wireless communication, comprising:
means for sending a channel quality indicator (CQI) channel at a first transmit power level if the CQI channel is not multiplexed with acknowledgement (ACK) channels from other user equipments (UEs);

means for sending the CQI channel at a second transmit power level lower than the first transmit power level if the CQI channel is multiplexed with the ACK channels from the other UEs; and means for generating multiple data sequences for the CQI channel without spreading, wherein the sending the CQI channel at the second transmit power level comprises sending the multiple data sequences in multiple symbol periods of a resource block at the second transmit power level, and wherein the ACK channels from the other UEs are sent with spreading in the resource block.

34. A computer program product, comprising:
a non-transitory computer-readable medium comprising:

code for causing at least one computer to send a channel quality indicator (CQI) channel at a first transmit power level if the CQI channel is not multiplexed with acknowledgement (ACK) channels from other user equipments (UEs);

code for causing the at least one computer to send the CQI channel at a second transmit power level lower than the first transmit power level if the CQI channel is multiplexed with the ACK channels from the other UEs; and code for causing the at least one computer to generate multiple data sequences for the CQI channel without spreading, wherein the sending the CQI channel at the second transmit power level comprises sending the multiple data sequences in multiple symbol periods of a resource block at the second transmit power level, and wherein the ACK channels from the other UEs are sent with spreading in the resource block.

35. An apparatus for wireless communication, comprising:
means for receiving a first control channel from a user equipment (UE) at a first received signal-to-noise ratio (SNR) if the first control channel is not multiplexed with second control channels from other UEs; and means for receiving the first control channel at a second received SNR different from the first received SNR if the first control channel is multiplexed with the second control channels from the other UEs, wherein the first control channel comprises a channel quality indicator (CQI) channel, wherein the second control channels comprise acknowledgement (ACK) channels, and wherein the second received SNR is lower than the first received SNR, the apparatus further comprising:

means for performing erasure detection for the CQI channel if multiplexed with the ACK channels from the other UEs; and means for skipping the erasure detection for the CQI channel if not multiplexed with the ACK channels from the other UEs.

36. A computer program product, comprising:
a non-transitory computer-readable medium comprising:
code for causing at least one computer to receive a first control channel from a user equipment (UE) at a first received signal-to-noise ratio (SNR) if the first control channel is not multiplexed with second control channels from other UEs; and code for causing the at least one computer to receive the first control channel at a second received SNR different from the first received SNR if the first control channel is multiplexed with the second control channels from the other UEs, wherein the first control channel comprises a channel quality indicator (CQI) channel, wherein the second control channels comprise acknowledgement (ACK) channels, and wherein the second received SNR is lower than the first received SNR, the computer-readable medium further comprising:

code for causing the at least one computer to perform erasure detection for the CQI channel if multiplexed with the ACK channels from the other UEs; and code for causing the at least one computer to skip the erasure detection for the CQI channel if not multiplexed with the ACK channels from the other UEs.

* * * * *